United States Patent [19]

Goodnight, Jr. et al.

[11] 3,995,071

[45] Nov. 30, 1976

[54] AQUEOUS PURIFIED SOY PROTEIN AND BEVERAGE

[75] Inventors: Kenneth C. Goodnight, Jr.; Grant H. Hartman, Jr.; Robert F. Marquardt, all of Evansville, Ind.

[73] Assignee: Mead Johnson & Company, Evansville, Ind.

[22] Filed: June 23, 1975

[21] Appl. No.: 589,299

[52] U.S. Cl. .............................. 426/598; 426/655; 426/656; 260/123.5
[51] Int. Cl.² ........................................... A23L 1/20
[58] Field of Search .................... 426/598, 655, 656; 260/123.5

[56] References Cited
UNITED STATES PATENTS

| | | |
|---|---|---|
| 2,732,395 | 1/1956 | Bolley et al. .................... 260/123.5 |
| 3,622,556 | 11/1971 | O'Connor ............................ 426/655 |
| 3,653,912 | 4/1972 | Koski et al. ......................... 426/656 |
| 3,736,147 | 5/1973 | Iacobucci et al. ............... 260/123.5 |

*Primary Examiner*—Jeanette M. Hunter
*Attorney, Agent, or Firm*—Robert E. Carnahan; Robert H. Uloth

[57] ABSTRACT

Soy protein having greatly reduced phytic acid and phytate complexes is prepared by aqueous extraction of defatted soy flakes, basification to a pH in excess of 10.1, and removal of insolubles. The clarified extract may be reduced in mineral and carbohydrates content by ultrafiltration. The purified aqueous extract may be advantageously used directly in the preparation of liquid dietary products without drying.

28 Claims, No Drawings

AQUEOUS PURIFIED SOY PROTEIN AND BEVERAGE

FIELD OF THE INVENTION

This invention is involved with seed protein isolation and utilization. A superior beverage based thereon is provided.

DESCRIPTION OF THE PRIOR ART

The prior art has dealt extensively with the subject of isolation, purification and improvement of the nutritional quality and flavor of soybean protein. Soybean protein in its native state is unpalatable and has impaired nutritional quality due to the presence of phytic acid complexes which interfere with mammalian mineral absorption, and the presence of antinutritional factors which interfere with protein digestion in mammals. The prior art has dealt with the destruction of the trypsin inhibitors by heat treatment and with the removal of phytic acid. It has also dealt with improving the yields of protein secured as purified isolate relative to that contained in the soybean raw material.

McKinney, et al., J. Biol. Chem., Vol. 178, pages 117–132 (1949) discloses that phytin slowly dissociates from soybean protein in alkaline dispersions at pH 11.0 to pH 11.5 and may be removed by centrifugation.

Iacobucci, et al., U.S. Pat. No. 3,736,147 patented May 29, 1973 disclose an ultrafiltration process for the preparation of soy protein isolate having a reduced phytic acid content which involves various chemical treatments in combination with extensive ultrafiltration. Chemical treatment involves either enzymatic hydrolysis of the phytic acid by the enzyme phytase at neutral pH prior to ultrafiltration, ultrafiltration in the presence of calcium ion at low pH, or the use of ethylenediamine tetraacetic acid at a high pH.

Frazeur, et al., U.S. Pat. No. 3,728,327 patented Apr. 17, 1973 disclose a membrane separation process for preparation of a soy protein isolate which requires homogenization of a soybean slurry followed by centrifugation and extensive reverse osmosis or ultrafiltration of a highly dilute solution followed by spray drying of the retentate.

SUMMARY OF THE INVENTION

The present invention provides a process for the preparation of an improved purified soy protein having exceptionally low phytic acid content, improved digestibility, high water solubility, improved functional characteristics, lack of beany flavor with substantially improved palatability, a neutral protein with low ash content, and affords improved protein yield, and high retention of sulfur containing amino acids. In its broadest concept, the invention involves aqueous extraction of defatted soybean flour or flakes at neutral or alkaline pH, separation of insoluble materials at a pH in excess of pH 10.1 which results in removal of the phytic acid and other phytates, ultrafiltration at a pH of less than 10, and optionally heat treatment of the aqueous extract prior to ultrafiltration. A further feature of the invention involves direct incorporation of the aqueous protein into special dietary and food products since it has been found that improved nutritional qualities, functionality (physical characteristics) and flavor are achieved when the aqueous protein is incorporated directly into the final composition as a liquid rather than employing an intermediate drying step prior to constitution with other ingredients.

DETAILED DESCRIPTION OF THE INVENTION

A five and optionally a six step process is involved in the present invention. The raw material for the process is particulate defatted soybean, preferably defatted soy flour or defatted soy flakes. Ground whole bean or full fat soy flour is not suitable since the presence of the oil interferes with proper separation of the protein and carbohydrate ingredients. The first step of the process involves preparation of an aqueous extract of particulate defatted soybean containing from about 2.5 to 20% by weight of soybeam solids. Any convenient means known to the art for the preparation of such extract may be employed, but we prefer to simply extract with water or with a mildly alkaline solution having a pH of from about pH 7 to pH 10, and preferably pH 9. If convenient, insoluble materials may be removed from the extract by centrifugation or filtration, but this is not necessary. It is not intended to limit the invention to any specified manner of preparing this initial extract since many modifications may be made depending upon the various objectives of the process. If the objective is to secure the maximum recovery of purified protein in the extract, larger amounts of extract water or alkaline solution are employed and the solids may be removed by centrifugation and reextracted. Where residual solids are to be used for animal feed it may be desirable to conduct a less thorough extraction or to omit washing of the solids after removal from the supernatant liquid. Similarly times and temperatures are varied to suit the particular operating purposes and equipment.

The second and third steps of the process and the key steps for the removal of phytic acid and phytate complexes involve basification of the extract to a pH within the range of pH 10.1 to pH 14, and preferably pH 11–12. Basification is preferably done at a temperature of at least about 10° C., more preferably at 20° to 50° C., and most preferably at 25° to 35° C. followed by separation of insoluble materials, for instance by centrifugation or filtration, while maintaining the temperature within this range. Sodium hydroxide, potassium hydroxide, or other water soluble bases may be used for basification. Mechanical homogenization is not necessary to effect efficient extraction of the protein, and is in fact undesirable in that reduction of the flux rate in the subsequent ultrafiltration step may occur.

In the fourth and fifth steps the clarified extract is neutralized to a pH of about 6 to 10, preferably in the range of pH 6.5–7.5, and further purified by ultrafiltration. The range of about pH 6.5–7.5 has the benefit of minimizing decomposition or interaction of the protein constituents of the extract. The clarified aqueous extract contains from 1–12% by weight of protein, 1–10% by weight of carbohydrate, and from 0.3 to about 3% by weight of impurities including mineral constituents reported as ash on combustion of a specimen. Due to the nature of the starting material employed the extract contains little fat, usually about 0.1% but in any event less than 1%. If extracts are prepared containing more than about 12% by weight of protein they are generally found to be viscous and both inconvenient to handle and inefficiently processed in the centrifugation, washing, and ultrafiltration steps. It is preferred to prepare a clarified neutralized extract for ultrafiltration having a protein content of about 3.5% by weight, a carbohydrate content of about 2% by weight and impurities reported as ash of about 1% or less by weight. When extracts having a protein concentration of 1% or less are employed, the expense of ultrafiltration is substantially increased due to the prolonged filtration stage, although operation on such dilute solutions is possible. We prefer to operate with a clarified extract containing about 3.5% by weight of protein, about 2% by weight of carbohydrate and no more than about 1% by weight of other impurities reported as ash.

The final step of the process is ultrafiltration carried out using an apparatus containing a semi-permeable membrane which will retain protein constituents, and allow lower molecular weight materials to pass. Semipermeable membranes having the capability of retaining proteins having a minimum molecular weight in the range of about 10,000–50,000 daltons are useful. The apparatus is operated at a gauge pressure of about 25 pounds per square inch but pressures in the range of about 15 to 100 psig are useful. Ultrafiltration according to the present invention is to be distinguished from other membrane filtration processes in respect of the porosity of the membrane employed and the pressure maintained on the retentate to force passage of excess water and low molecular weight ingredients. Reverse osmosis processes, for example, used membranes having much lower porosity and retain much lower molecular weight materials such as the carbohydrate constituents of the soybean which it is desired to eliminate by the present process. Reverse osmosis processes are also considerably more expensive to operate in that higher operating pressures and generally lower flux rates are involved.

The retentate is preferably maintained at a temperature of about 45° C. during the ultrafiltration process in order to increase the flux rate and reduce the time required to achieve the desired concentration of the protein ingredients.

It is preferred to produce a final product having a protein concentration of about 7% by weight. This is readily achieved by the ultrafiltration process outlined above. For instance, when commencing with a clarified extract having a protein concentration of 3.5%, removal of half of the volume of water contained therein as permeate results in a retentate having a concentration of 7%. A substantial reduction in carbohydrate and mineral content occurs through elimination of these ingredients with the permeate water. Since the soybean carbohydrate substituents are generally undesirable nutritional ingredients due to their difficulty of digestion by man, it is desirable to eliminate a major proportion thereof. We have expressed the carbohydrate content of the purified aqueous soybean protein prepared in our present studies as protein coefficient which is the ratio of the protein content of the thereof to the total of the protein and carbohydrate content. For infant formula use we prefer a protein coefficient of about 0.90 since the soybean carbohydrates cause flatulence and undesirable stools in infants subsisting on the soy protein based formula.

It has been found that by concentration of a 3.5% by weight protein containing extract by ultrafiltration to one-half of its original volume that the retentate still contains an undesirably high proportion of carbohydrate for infant formula use. Such product is suitable for certain other food uses, however. We have found that diafiltration (a form of ultrafiltration in which the retentate is continuously diluted with water or a wash solution) once the desirable protein concentration has been established in the retentate by simple ultrafiltration is an appropriate way of eliminating remaining undesired carbohydrate and mineral constituents. This amounts simply to continuously adding a diafiltration solution to the retentate as it is circulated through the filtration apparatus at a rate which is equal to the volume of permeate removed. Diafiltration thus constitutes a washing operation in which the undesired low molecular weight constituents are washed from the retentate. Referring to the original volume of clarified extract as 1 in a preferred form of the process, ½ volume of permeate is removed by ultrafiltration and then from ½ to 2½ volumes of water are used for dilution of the retentate during diafiltration until the total permeate collected is up to 3 volumes. Diafiltration to provide a larger permeat volume affords little additional purification. Instead of water, diafiltration solutions containing desired ingredients for the final product, or which improve protein retention or flux rate may be employed.

As to the alkaline treatment in the second step it has been found that the phytate content of the extract drops abruptly at pH's in excess of 10.1. At pH 10.6 an extract is produced having a phytate content of about 1 g./100 g. of solids in the extract. At pH 11.0 the phytate content of the extract is about 0.05 g./100 g. of solids in the extract. As the pH is increased the tendency to hydrolyze the protein and effect condensation through the sulfur containing amino acids increases. Thus while phytate removal is efficient at all pH values in excess of 10.1 it is preferred to operate in the range of about pH 11–12 to avoid as much as possible a loss in protein quality due to hydrolysis or condensation of sulfur containing amino acids.

The temperature during alkaline treatment should be in the range of 6° to 100° C. and preferably in the range of 20° to 50° C. and most preferably in the range of 25° to 35° C. It has been found that removal of phytate is incomplete but, nevertheless, significant at temperatures of less than 10° C. during alkaline treatment at pH 11–12. At 10° C., approximately one-half of the phytate is removed, while at 20° C., 90% of the phytate is removed, and at 30° C., more than 99% removal is effected.

A modification of the process, constituting a sixth and optional step, involves short-term high temperature heat treatment of the clarified extract just prior to ultrafiltration. This not only improves the flux rate during the filtration step but more importantly increases the nutritional value of the resulting concentrate. A graded temperature in the range of 60° C. for 30 min. to 175° C. for 1 second is employed. By graded is meant that the time is interpolated to correlate with the temperature within the above ranges. The preferred range is from 100° C. for 10 min. to 130° C. for 1 min., the latter being most preferred. Heat treatment in this fashion increases the nutritional value of the product as is described in more detail hereinafter.

An important aspect of the present invention involves formulation of the aqueous soy protein which constitutes the retentate on completion of ultrafiltration and diafiltration directly into a liquid dietary product by combination with the desired carbohydrate and fat ingredients and if desired, vitamins and minerals. This is particularly desired for the manufacture of infant formula products since the resulting products have not only improved nutritional value, but improved functional characteristics such as solubility, suspendibility, viscosity, mouth feel, and emulsion stability.

DESCRIPTION OF SPECIFIC EMBODIMENTS

Example 1.—Extraction at pH 12

Defatted soybean flakes, 400 g., are suspended in 3.2 liters of water, the slurry adjusted to pH 12 with aqueous sodium hydroxide solution, and mixed for 60 min. at room temperature (about 25° C.). Insoluble material is then removed by centrifugation at 2000 rpm (3650 xg) for 20 min. The insolubles are washed with three 2 l. portions of water with centrifugation after each wash. The original and wash centrifugates are combined and further clarified by means of a high speed centrifuge to give a clear extract containing about 3.5% by weight of protein, 2% by weight of carbohydrate, about 1% by weight of inorganic constituents reported as ash and less than about 0.1% by weight of fat. The clarified extract is then neutralized to pH 7.0 with aqueous hydrochloric acid and concentrated by ultrafiltration at 25 psig using a hollow fiber membrane apparatus (Romicon Hollow-Fiber XM-50 Cartridge) having the capability of retaining protein constituents having a molecular weight of 50,000 daltons or higher and passing lower molecular weight materials including inorganic and carbohydrate constituents. The initial neutralized extract had a volume of 9.2 l. and was concentrated until 4.6 l. of permeate had been collected by continuous recycling through the hollow-fiber apparatus. The retentate was then diluted with water as it was recycled through the hollow-fiber apparatus with the water being supplied to the retentate at the same rate that permeate was collected resulting in purification by diafiltration. After an additional 13.8 l. of permeate had been collected, the retentate constituting the aqueous purified soy protein of the present invention was removed from the apparatus, analyzed for protein, carbohydrate, phytate, and ash, and passed to storage or further processing. The clarified extract, the retentate, and the diafiltration water were maintained at about 45° C. during the ultrafiltration process.

The aqueous purified soy protein produced by Example 1 contains 3.82% by weight of solids which includes 3.66% by weight of protein and 0.14% by weight of carbohydrate. It is a suitable protein ingredient for direct combination with additional ingredients such as carbohydrates, minerals, fat, vitamins, and, if desired, flavors for the preparation of a ready-to-use infant formula, a milk substitute, or a liquid dietary product suitable for the feeding of debilitated patients, as a convenience meal substitute, or as the sole diet.

For use in the preparation of infant formulas, and of interest for general dietary use also, an important feature of the present process for producing aqueous purified soy protein is the removal of the soybean carbohydrate constituents. A soy protein ingredient for infant formula use should desirably have a protein coefficient of at least 0.9. The protein coefficient is defined as the ratio of the protein content to the sum of the protein content and the carbohydrate content. The product produced by the process of Example 1 has a protein coefficient of 0.96. The extent of carbohydrate removal is largely dependent upon the amount of water used for diafiltration during the ultrafiltration step. For instance, in the foregoing example, 18.4 l. of permeate was collected from an initial extract of 9.2 l. which was first concentrated to a volume of 4.6 l. and then purified by diafiltration with 13.8 l. of water. This is referred to as a 2 volume purification (ratio of permeate volume to initial extract volume). The following tabulation illustrates the protein coefficient for various batches prepared according to the process of Example 1 but varying the volume of diafiltration water, and also using potassium hydroxide for neutralization of the initial extract rather than using sodium hydroxide. In each instance the final concentrate had a volume one-half that of the original clarified neutralized extract charged to the ultrafiltration step.

| EFFECT OF DIAFILTRATION ON CARBOHYDRATE CONTENT | | |
|---|---|---|
| Volume Ratio[3] | Protein Coefficient | |
| | Potassium Hydroxide | Sodium Hydroxide |
| 0[1] | 0.77 | 0.77 |
| 0.5[2] | 0.85 | 0.87 |
| 1.0 | — | 0.92 |
| 1.5 | 0.95 | 0.95 |
| 3.0 | 0.97 | — |

[1]The clarified neutralized extract prior to ultrafiltration.
[2]Ultrafiltration only with no added water for diafiltration.
[3]Ratio of total permeate volume to neutralized extract volume.

Ultrafiltration alone to 0.5 volumes is insufficient to provide a protein coefficient of 0.90 as is desired for the preparation of an infant formula. Soya protein concentrate having a protein coefficient of about 0.8 is useful for other purposes, however, such as in the fortification of conventional foods such as meat and bread. A protein coefficient of 0.90 can be achieved by modification of the foregoing example by further ultrafiltration to less than 0.5 volumes. However, when the liquid concentrate is to be used directly in the preparation of a finished food product by combination with other ingredients wherein the fluid volume thereof is compatible, the equipment is better suited and it is less costly to reduce the soybean carbohydrate content by diafiltration rather than extensive concentration by ultrafiltration. The experiments represented in this tabulation also show that potassium hydroxide may be substituted for sodium hydroxide and further that diafiltration to provide in excess of 1.5 volumes of permeate results in little further improvement in the protein coefficient.

The protein yield in the aqueous purified soy protein product produced by the process of Example 1 was 76% based upon the amount of protein in the defatted soybean flakes used as starting material.

The product produced by the method of Example 1 was analyzed for phytic acid by the ferric chloride method of Makower, J. Sci, Food Agr., 20, 82–84 (1969). The value was found to be 0.13 grams per 100 grams of solids contained in the aqueous concentrate. A series of experiments was conducted in the same fashion as described in Example 1, but involving adjustment of the initial extraction slurry to various pH values. The following tabulation correlates extraction pH with phytate content of the final aqueous concentrate.

| PHYTATE CONTENT (g./100 g. solids) AS A FUNCTION OF EXTRATION pH | |
|---|---|
| pH | Phytate |
| 8.5 | 2.18 |
| 9.0 | 2.13 |
| 9.5 | 2.11 |
| 10.0 | 2.14 |

-continued

PHYTATE CONTENT (g./100 g. solids) AS A
FUNCTION OF EXTRATION pH

| pH | Phytate |
|---|---|
| 10.5 | 1.45 |
| 11.0 | 0.05 |

Interpolation of these data reveals that a neutralization pH of at least about pH 10.6 is desirable to reduce the phytate content below 1 g./100 g. solids in the final concentrate.

Another series of experiments was conducted similar to Example 1 employing pH 11 for extraction of soybean flakes for various periods of time. The phytate content of the resulting aqueous purified soy protein in each instance was then correlated with extraction time. The following results were obtained. A 15 min. extraction period was sufficient to eliminate the phytate, but better protein yields are obtained with extraction periods of at least about 30 min.

PHYTATE (g./100 g. solids) AS A
FUNCTION OF EXTRACTION TIME

| Minutes | Phytate |
|---|---|
| 15 | 0.01 |
| 30 | <0.01 |
| 60 | 0.01 |
| 120 | <0.01 |

The aqueous soya protein concentrate produced by the process of Example 1 was analyzed for sulfur amino acid content. It was found to contain 1.3 grams methionine/100 grams of protein contained therein and 1.2 grams of cysteine/100 grams of protein contained therein. Two commerically available acid precipitated soy protein concentrates were assayed by the same method and each was found to contain 1.0 g. methionine/100 g. of protein and 0.9 g. of cysteine/100 g. of protein thus illustrating the superiority of the liquid concentrate of the present invention. The sulfur amino acids are the limiting constituents determinative of the nutritional quality of soy protein isolate.

Example 2 — Extraction at pH 9 and Subsequent Phytate Removal at pH 11–12

Defatted soybean flakes, 400 g., are suspended in 6.4 l. of water, the pH of the slurry is adjusted to pH 9.0 and the mixture is agitated at room temperature for from 15 to 60 min. The spent flakes are then removed by means of a desludging centrifuge and the extract is adjusted to pH 11–12 with aqueous sodium hydroxide. Other alkalis may be used. A diatomaceous filter aid is added and the basified extract is clarified by filtration at room temperature. The filtrate is then adjusted to pH 7.0 with hydrochloric or sulfuric acid to provide the neutralized clarified extract which is purified by ultrafiltration and diafiltration for a total of 2 permeate volumes as described in Example 1.

The process of Example 2 was repeated with basification and filtration of the extract at various temperatures in order to evaluate the dependence of phytic acid removal upon temperature. A simplified procedure for determining phytic acid was employed in which 15 ml. of basified filtered extract prior to ultrafiltration at pH 12.0 was kept overnight in a 15 ml. graduated centrifuge tube in a water bath at 3° C. The sample was then centrifuged at 70 × g for 30 min. in a swinging bucket head. The volume of the precipitate formed at the bottom of the centrifuge tube was then read and compared to the volume of centrifuged precipitate produced with a sample of the desluged extract which was simply adjusted to pH 12 and then submitted to the test without the intervening filtration step. The percentage volume of the precipitate was calculated and subtracted from 100% to express the result as percent phytic acid remaining in the aqueous filtrate prior to purification thereof by ultrafiltration. The following results were obtained.

Temperature Dependence of Phytic Acid Removal

| pH Adjustment Temperature | % Phytic Acid Remaining by Volume |
|---|---|
| 5° C. | 69 |
| 10° C. | 46 |
| 15° C. | 15 |
| 20° C. | 10 |
| 25° C. | 5 |
| 30° C. | 0 |

Example 3 — Formulation of Soy Milk

About 1.3 l. of the aqueous purified soy protein produced by the method of Example 1 (equivalent to 50 g. of protein) was formulated with the following ingredients, homogenized, canned, and heat sterilized.

| | |
|---|---|
| Corn oil | 52.5 g. |
| Corn syrup solids | 15.6 g. |
| Sucrose | 60 g. |
| Milk Salts | 13 g. |
| Magnesium chloride | 1.3 g. |
| Water, qs. | 1500 g. |

The resulting composition contained 3.5% by weight of fat, 3.3% by weight of protein, and 5% by weight of carbohydrate, had a bland taste, quite devoid of the customary beany flavor associated with soybeans, and resembled cow's milk in appearance.

The advantages of that aspect of the present invention which involves incorporating the purified soy protein in solution as produced in Example 1 directly into a liquid dietary product as in Example 3 without precipitating or drying the purified soy protein was illustrated by the following experiment. A portion of one batch of the aqueous purified soy protein produced by the method of Example 1 was dried in a conventional hot air spray drier operated at an inlet temperature of about 150° C. and an outlet temperature of about 82.5° C and the resulting dry powder reconstituted with water to the original volume. The sedimentation indexes and the nitrogen solubility indexes were then measured on the remaining portion of the original aqueous soy protein and on the reconstituted spray dried portion and the results compared. See the following table.

SOLUBILITY PARAMETERS OF AQUEOUS PURIFIED SOY PROTEIN AS COMPARED TO RECONSTITUTED DRIED SOY PROTEIN

| Sample | Sedimentation Index (g.)[3] | Nitrogen Solubility Index (ratio)[3] |
|---|---|---|
| 1. Example 1 | 0.99 | 93 |
| 2. Spray Dried[1] | 2.15 | 70 |
| 3. Commercial[2] | 10.10 | 45 |

[1]Aqueous purified soy protein of Example 1, spray dried and reconstituted with water to original volume.
[2]Commercial dry soy protein suspended in water at same percent solids as Samples 1 and 2.
[3]The test method is described below.

The sedimentation index in the foregoing test was determined as follows.

1. The liquid or reconstituted sample is adjusted to a protein concentration of 5% by weight.
2. A 45 g. aliquot is placed in a tared centrifuge tube.
3. The aliquot is spun at 27,500 × g for 15 minutes at 18° C.
4. The supernatant liquid is decanted and the tubes inverted and drained on a towel for 1 min.
5. The tubes are weighed and the weight of sediment determined.
6. Results are expressed as grams of sediment per 45 g. of 5% protein solution.

The nitrogen solubility index in the foregoing experiment was determined as follows.

1. The aqueous soy protein solution is diluted to 2.5% by weight of solids.
2. Adjust to pH 7 and stir for 25 minutes.
3. Place 25 ml. in a 50 ml. centrifuge tube and centrifuge 20 min. at 5,200 rpm.
4. Filter the supernatant liquid through Whatman No. 1 filter paper and assay the filtrate for protein using the Lowry procedure, Jour. Biol. Chem., 193, 265 (1951).
5. The nitrogen solubility index is expressed as a NSI = % protein in filtrate divided by % protein in original sample multiplied by 100.

In another experiment where the aqueous purified soy protein of Example 1 was compared to a reconstituted spray dried sample thereof prepared as described above involved measurement of the emulsion stability index at 7, 14 and 28 days of the soy milk prepared as described in Example 3 and of a similar soy milk prepared from the spray dried reconstituted soy protein. The values obtained are shown in the following table.

Method Steps

1. Draw up ca. 20 ml. of product into a syringe and force most of it back out a couple of times to remove the air in the syringe. Fill the syringe to the 2 oz. mark.
2. Place the filled syringe, point down, in a support rack.
3. Several syringes can be filled from the same can but some product must be retained for fat analysis of the product before storage. This "before storage" sample is called the initial sample and reflects the fat concentration of the product with a homogeneous dispersion.
4. At the end of the storage time the syringe is taken out of the 37° C. storage chamber. By holding the syringe upright and at eye level, the product defects can be observed and noted. Serum, for instance, is a zone toward the bottom of the syringe, usually of reduced solids and appears "thinner".
5. Push out all but the top 10 ml. of test soy milk sample. This remainder is to be saved for duplicate fat analysis.
6. Calculation of results $$ESI_{days\ of\ storage} = \frac{Initial\ fat\ \%}{Time\ period\ fat\ \%} \times 100$$

7. Expression of results
"EST = 85" means: Emulsion Stability Index for product stored at seven days equals 85.
8. Interpretation of Results
As the fat accumulates at the top of the syringe, the ESI will drop.
Example:
Initial homogeneous value = 7%
Value at top after 14 days = 12%

$$ESI_{14} = \frac{7}{12} \times 100 = 58$$

The aqueous purified soy protein of the present invention has improved functional characteristics relative to spray dried material with respect to solubility as reflected by the nitrogen solubility index, and suspendibility index data given above and by the emulsion stability index data for the soy milk of Example 3. These are important advantages for liquid dietary products for consumer use.

EMULSION STABILITY INDEX (ESI) OF SOY MILK FOLLOWING SHELF STORAGE

| Protein Ingredient | 7 Days | 14 Days | 28 Days |
|---|---|---|---|
| Example 1 | 91 | 83 | 73 |
| Spray Dried Reconstituted Example 1 | 80 | 75 | 68 |

The emulsion stability index was determined as follows. The method is primarily designed to objectively, precisely, and quickly measure the emulsion stability of oil-in-water emulsions. The results obtained have correlated with shelf studies. The stability is measured by the degree in which the oil/fat fraction stays in the original homogeneous dispersion. Instability is manifested by an increase in fat content toward the top of the container (can).

Example 4 — Extraction At pH 12 With Heat Treatment

An aqueous purified soy protein was prepared according to Example 1 with the following modification. After neutralization of the clarified extract, the extract was heated in a direct steam injection with hold-tube apparatus through which the clarified extract was passed at a rate regulated so that the temperature of the extract was quickly raised to 130° C., maintained at that temperature for 1 min. and then immediately cooled to 45° C. just prior to ultrafiltration. The process was then completed in the same fashion as is described in Example 1.

The benefits of heat treatment illustrated in Example 4 are three-fold. Heat treatment improves the flux rate during subsequent ultrafiltration. Second, the bacterial count is reduced and eliminates or at least minimizes bacterial contamination. Most importantly, a significant improvement in nutritional quality of the soy protein results from heat treatment. This is illustrated by the results of a feeding experiment employing rats in which the nutritional quality of the product of Example 1 was compared to that of Example 4 by incorporation as the sole protein ingredient in the feed. Each of these was compared to similar rations prepared from a commercial dry soy protein isolate and to rations prepared from casein as reference standard. Weight gain and protein efficiency ratios were determined. The following results were obtained.

NUTRITIONAL QUALITY

| Sample | 4 Week Weight Gain | Protein Efficiency Ratio[1,2] | |
|---|---|---|---|
| | | g. Gain Per g. Protein Consummed | % of Casein |
| ANRC Casein | 89 ± 19 | 2.9 ± 0.4 | 100 |
| Example 1 | 72 ± 9 | 2.2 ± 0.2 | 76 |
| Example 4 | 83 ± 11 | 2.6 ± 0.2 | 87 |
| Acid Precipitated[3] | 54 ± 8 | 1.8 ± 0.1 | 61 |

[1]"Biological Evaluation of Protein Quality," Official Methods of Analysis of the Association of Official Agricultural Chemists, 10th Edition, 1965, pp. 785–786.
[2]The values reported differ from one another statistically at the 0.01 level of probability using the t-test.
[3]Soy protein isolate prepared by extracting defatted soy flakes with water, precipitating the soy protein by acidification to pH 4.6, collecting the precipitate (centrifute), washing with water (centrifuge), redissolving in water at pH 7.0 (NaOH), and freeze-drying.

What is claimed is:
1. The process for preparing an aqueous purified soy protein solution which comprises
   a. preparing an aqueous extract of particulate defatted soybean with water or at neutral or alkaline pH containing about 2.5 to 20% by weight of solids;
   b. adding sufficient of a water soluble base to said extract to adjust the pH thereof within the range of pH 10.1–14;
   c. separating insoluble material from said extract to yield a clarified extract containing about 1 to 12% by weight of protein, about 1 to 10% by weight of carbohydrate, about 0.3 to 3% by weight of mineral constituents reported as ash, and about 0 to 1% by weight of fat;
   d. neutralizing said clarified extract to a pH in the range of from 6 to 10;
   e. separating carbohydrate and mineral constituents from said clarified extract by ultrafiltration employing a semi-permeable membrane which has the capability to retain proteins to provide said aqueous soy protein solution as retentate containing from 1 to 12% by weight of protein, a protein coefficient of at least 0.8, and up to about 0.1% by weight of fat.

2. The process of claim 1 wherein steps (b) and (c) are carried out at a temperature of at least about 10° C.
3. The process of claim 1 wherein steps (b) and (c) are carried out at a temperature in the range of about 20° to about 50° C.
4. The process of claim 1 wherein steps (b) and (c) are carried out at a temperature in the range of about 25° to about 35° C.
5. The process of claim 2 wherein said clarified extract after neutralization in step (d) is heated at a temperature in the range of from 60° to 175° C. for a period of from 30 minutes to 1 second prior to ultrafiltration in step (e).
6. The process of claim 5 wherein a temperature in the range of from 100–130° C. for a period of about 10 minutes to 1 minute is employed.
7. The process of claim 5 wherein a temperature of about 130° C. for a period of about 1 minute is employed.
8. The process of claim 2 wherein said ultrafiltration in step (e) includes continuous recycling of retentate to said semi-permeable membrane until sufficient filtrate, including a portion of the carbohydrate and mineral constituents, has been removed to yield a retentate having desired protein concentration, and thereafter removing additional carbohydrate and mineral constituents by diafiltration while maintaining the volume of said retentate substantially constant to provide a retentate having the composition specified in step (e).
9. The process of claim 8 wherein diafiltration is continued until said retentate has a protein coefficient of at least about 0.9.
10. The process of claim 8 wherein said purification by diafiltration employs from 0.5 to 2.5 parts by volume of water per part by volume of said neutralized clarified supernatant liquid produced in step (d).
11. The process of claim 8 wherein said neutralized clarified extract produced in step (d) contains about 3.5% by weight of protein, about 2% by weight of carbohydrate, and no more than about 1% by weight of mineral constituents reported as ash and is concentrated by ultrafiltration in step (e) to provide a retentate having about one-half the volume of said neutralized clarified supernatant liquid produced in step (d) and is thereafter purified by diafiltration with from 1 to 2 parts by volume of water per part by volume of clarified extract produced in step (d) to afford said aqueous soy protein solution as retentate containing about 7% by weight of protein, up to about 0.1% by weight of carbohydrate, and up to about 0.1% by weight of fat.
12. The process of claim 2 wherein said neutralized clarified extract produced in step (d) is maintained at a temperature of about 45° C. during ultrafiltration in step (e).
13. The process of claim 2 wherein said aqueous extract in step (a) is prepared at pH 7–9.
14. The process of claim 2 wherein said base in step (b) is an alkali metal hydroxide.
15. The process of claim 2 wherein said pH in step (b) is pH 11–12.
16. The process of claim 2 wherein said clarified supernatant liquid neutralized in step (d) is pH 6.5–7.5.
17. The process of claim 2 wherein said aqueous soy protein solution is dried.
18. The process of preparing a liquid dietary product containing soy protein as principal protein ingredient having improved nutritional value, and physical stability as compared to a similar product produced from dried soy protein isolate which comprises combining said aqueous soy protein concentrate produced by the process of claim 1 with other nutritional ingredients and thereafter heat sterilizing said composition.
19. The product produced by the process of claim 1.

20. The product produced by the process of claim 2.
21. The product produced by the process of claim 3.
22. The product produced by the process of claim 4.
23. The product produced by the process of claim 5.
24. The product produced by the process of claim 15.
25. The product produced by the process of claim 17.
26. The product produced by the process of claim 18.
27. The process of preparing a liquid dietary product containing soy protein as principal protein ingredient having improved nutritional value, and physical stability as compared to a similar product produced from dried soy protein isolate which comprises combining said aqueous soy protein concentrate produced by the process of claim 1 with other nutritional ingredients.
28. The product produced by the process of claim 27.

* * * * *

UNITED STATES PATENT OFFICE
CERTIFICATE OF CORRECTION

PATENT NO. : 3,995,071

DATED : November 30, 1976

INVENTOR(S) : Kenneth C. Goodnight, Jr. et al.

It is certified that error appears in the above-identified patent and that said Letters Patent are hereby corrected as shown below:

Column 2, line 14, change "soybeam" to read -- soybean --.

Column 3, line 26, change "used" to read -- use --.

Column 4, line 17, change "permeat" to read -- permeate --.

Column 10, line 29, change "EST" to read -- $ESI^7$ --.

Column 11, lines 34-35, change "centrifute" to read -- centrifuge --.

Claim 16, line 2, after "liquid" insert -- is --.

Claim 16, line 2, after "(d)" delete "is" and insert -- to --.

Signed and Sealed this

Twenty-ninth Day of March 1977

[SEAL]

Attest:

RUTH C. MASON
Attesting Officer

C. MARSHALL DANN
Commissioner of Patents and Trademarks